(12) United States Patent
Hori

(10) Patent No.: US 12,083,605 B2
(45) Date of Patent: Sep. 10, 2024

(54) CUTTING TOOL

(71) Applicant: TUNGALOY CORPORATION, Fukushima (JP)

(72) Inventor: Issei Hori, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 321 days.

(21) Appl. No.: 17/687,425

(22) Filed: Mar. 4, 2022

(65) Prior Publication Data

US 2022/0314341 A1 Oct. 6, 2022

(30) Foreign Application Priority Data

Apr. 5, 2021 (JP) ................................. 2021-063934

(51) Int. Cl.
*B23B 51/02* (2006.01)

(52) U.S. Cl.
CPC ........ *B23B 51/02* (2013.01); *B23B 2251/182* (2022.01); *B23B 2251/188* (2022.01); *B23B 2251/204* (2013.01); *B23B 2251/402* (2013.01); *B23B 2251/408* (2013.01)

(58) Field of Classification Search
CPC .............. B23B 51/02; B23B 2251/182; B23B 2251/188; B23B 2251/204; B23B 2251/402; B23B 2251/404
See application file for complete search history.

(56) References Cited

U.S. PATENT DOCUMENTS

| 4,411,563 | A | * | 10/1983 | Moon | ..................... B23B 51/02 408/230 |
| 11,819,931 | B2 | * | 11/2023 | Kauper | ................... B23B 51/02 |
| 2004/0067115 | A1 | | 4/2004 | Yamamoto | |
| 2010/0296887 | A1 | | 11/2010 | Moseley et al. | |

(Continued)

FOREIGN PATENT DOCUMENTS

| DE | 103 31 328 A1 | 4/2004 |
| DE | 10 2009 003 287 A1 | 11/2010 |
| DE | 10 2011 016 209 A1 | 11/2011 |

(Continued)

*Primary Examiner* — Eric A. Gates
(74) *Attorney, Agent, or Firm* — Studebaker & Brackett PC

(57) ABSTRACT

Provided is a cutting tool capable of improving both the biting property to a work material and the chip discharge property. The cutting tool includes a drill body rotated about a central axis, four or more cutting edges formed on one end portion of the drill body to face a forward side of a rotation direction, and a flute groove that is formed between the cutting edges adjacent to each other in a circumferential direction and extends substantially spirally along the central axis. (1) The one end portion includes a first tip portion that includes the central axis and has a first tip angle, and a second tip portion that extends from the first tip portion to an outer peripheral edge of the drill body and has a second tip angle larger than the first tip angle, and (2) the drill body includes a first core thickness portion that is formed in such a manner that a core thickness thereof gradually decreases from the one end portion to the other end portion, and a second core thickness portion that is formed in such a manner that a core thickness thereof is constant from the first core thickness portion toward the other end portion.

4 Claims, 10 Drawing Sheets

(56) References Cited

U.S. PATENT DOCUMENTS

| 2011/0268518 | A1 | 11/2011 | Sampath et al. |
| 2012/0076597 | A1 | 3/2012 | Krenzer et al. |

FOREIGN PATENT DOCUMENTS

| GB | 2491956 | A | * | 12/2012 | ............ B23B 51/02 |
| JP | H02-056517 | U | | 4/1990 | |
| JP | 2006205277 | A | * | 8/2006 | |
| JP | 2008194774 | A | * | 8/2008 | |
| JP | 2009-000806 | A | | 1/2009 | |
| JP | 2009136998 | A | * | 6/2009 | |
| JP | 2012011481 | A | * | 1/2012 | |
| JP | 2012-529375 | A | | 11/2012 | |
| JP | 2017042879 | A | * | 3/2017 | ............ B23B 51/00 |
| JP | 2019-048347 | A | | 3/2019 | |
| WO | WO-2010055559 | A1 | * | 5/2010 | ............ B23B 51/02 |
| WO | 2019/176452 | A1 | | 9/2019 | |

* cited by examiner

CUTTING TOOL

BACKGROUND

Field

The present invention relates to a cutting (drilling) tool with four or more drill blades that is excellent in both biting property to a work material and chip discharge property.

Description of Related Art

As a means for improving the machining efficiency of a work material by a drill, there has conventionally been proposed a 4 flute drill having twice the number of blades as a normal 2 flute drill (see Patent Publication JP-A-2019-048347). The 4 flute drill of the prior art is intended to improve the biting property to the work material and suppress burrs from forming toward a back surface of the work material, and has the following configuration. In other words, on a tip surface of such a 4 flute drill, the four blades are composed of two parent cutting edges that are continuous from a radially outer peripheral end portion toward the center and two child cutting edges that are located between the parent cutting edges in a circumferential direction and continuous from the radially outer peripheral end portion toward the middle of the center. Furthermore, in viewing the tip surface in the direction along the length of the child cutting edges, the ridge lines and the like of the parent cutting edges are formed in a convex shape protruding toward the tip surface from the radial outer peripheral side to the center, and in viewing the tip surface in the direction along the length of the parent cutting edges, the ridge lines and the like of the child cutting edges are formed in a concave shape recessed toward the tip surface from the radial outer peripheral side to the center.

SUMMARY

However, although the 4 flute drill of the prior art is capable of drilling holes in the work material with high machining efficiency, in order to ensure the strength of the drill tip and because thinnings easily interfere with each other due to the large number of edges, the chisel becomes larger (the chisel edge becomes thicker) than that of a 2 flute drill, and as a result, the biting property to the work material is yet insufficient. Also, in the 4 flute drill of the prior art, since the width of one flute groove is inevitably narrower than that of a normal 2 flute drill, the volume of the flute groove is relatively small, and as a result, resulting in poor chip discharge property.

Therefore, the present disclosure was contrived in view of such circumstances, and an object thereof is to provide a cutting tool capable of improving both biting property to a work material and chip discharge property.

In order to achieve the foregoing object, the present invention employs the following configurations.

[1] An example of a cutting tool according to the present disclosure includes a drill body rotated about a central axis, four or more (main) cutting edges formed on one end portion of the drill body to face a forward side of a rotation direction, and a flute groove that is formed between the cutting edges adjacent to each other in a circumferential direction and extends substantially spirally along the central axis. Also, (1) the one end portion includes a first tip portion that includes the central axis and forms (has) a first tip angle, and a second tip portion that extends from the first tip portion to an outer peripheral edge of the drill body and forms (has) a second tip angle larger than the first tip angle, and (2) the drill body includes a first core thickness portion that is formed in such a manner that a core thickness thereof gradually decreases from the one end portion to other end portion, and a second core thickness portion that is formed in such a manner that a core thickness thereof is constant from the first core thickness portion toward the other end portion.

In this configuration, the one end portion of the drill body at which the cutting edges are formed abuts on a work material and rotates to perform hole cutting on the work material. The resultant chips generated by the cutting edges flow through a rake face side (flute groove) formed between the cutting edges adjacent to each other in the circumferential direction, and are discharged from the machined hole. In this hole cutting, the first tip portion (including a chisel edge) that forms the relatively small (sharp) first tip angle at the one end portion first comes into contact with the work material. Therefore, even if the chisel edge of the cutting tool tends to become large as compared to that of a 2 flute drill, the biting property to the work material can be improved sufficiently. Also, at the one end portion, since the second tip angle of the second tip portion extending from the first tip portion to the outer peripheral edge of the drill body is larger than the first tip angle of the first tip portion, the distance in the direction of the central axis from the first tip portion biting on the work material to the cutting edge on the outermost periphery becomes relatively short. This reduces the time it takes for the rotation of the drill body to become unstable when the first tip portion bites into the work material and the cutting by the second tip portion proceeds, and improves the guide function of the drill body since a shoulder of the second tip portion easily fits in the machined hole.

Further, the core thickness of the first core thickness portion in a part from the one end portion to the other end portion decreases gradually, and the core thickness of the second core thickness portion in a part toward the other end portion is made constantly thin. Therefore, by appropriately setting the degree of reduction of the core thickness, the core thickness can be reduced from the part near the one end portion to increase the volume of the flute groove. As a result, the chip discharge property can be further improved.

[2] More specifically, in the configuration described above, the first tip portion may be formed so as to be a part extending from the central axis to approximately 20% of a radius of the drill body, the first tip angle may be approximately 120°, and the second tip angle may be approximately 140°. According to the knowledge of the inventors of the present invention, by adopting such a configuration, the excellent biting property to the work material and the excellent guide function of the drill body that are described above can be achieved more easily while effectively preventing loss or damage of the first tip portion.

[3] More specifically, in the configuration described above, the first core thickness portion may be configured to include a core thickness of approximately 35% of a diameter of the drill body at a hem outer peripheral position of the one end portion, and a core thickness taper formed in such a manner that the core thickness decreases by approximately −2% (approximately −2 mm/100 mm) from the hem outer peripheral position of the one end portion to a position at a distance approximately twice the diameter of the drill body toward the other end portion. According to the knowledge of the inventors of the present invention, with such a configuration, the volume of the flute groove can be increased at an early stage by reducing the core thickness from the part closer to the one end portion while keeping the rigidity of the drill body. Therefore, the above-mentioned excellent chip discharge property can be achieved more easily.

[4] Moreover, the above configuration may further include a thinning portion that is formed at a tip of the flute groove and includes a first thinning arranged on a flank surface side of the cutting edges and a second thinning arranged from the first thinning toward the flute groove. In such a configuration, an original chisel edge is removed by the thinning portion, thereby forming a thinning cutting edge. Also, since the thinning portion has a two-stage configuration, the volume of the thinning pocket for discharging chips generated during hole cutting of the work material can be made larger than that of a thinning portion with a one-stage configuration. Since the intersections of the thinning cutting edge and the (main) cutting edges can form a more obtuse angle as compared with when the thinning portion has a one-stage configuration, loss of the intersections and surrounding parts can be suppressed.

[5] Further, in the above configuration, a penetration angle and an open angle of the first thinning may be larger than a penetration angle and an open angle of the second thinning, respectively. In such a configuration, since the volume of the thinning pocket is further increased by the first thinning, the chip discharge property can be further improved. In addition, curls (winding condition) of the generated chips can be reduced by the second thinning. As a result, the shape of the chips is reduced, and the chips can easily move through the flute groove more densely and quickly, thereby further improving the chip discharge property.

[6] Also, more specifically, in the above configuration, the penetration angle and the open angle of the first thinning may be approximately 40° and approximately 60°, respectively, and the penetration angle and the open angle of the second thinning may be approximately 30° and approximately 55°, respectively. According to the knowledge of the inventors of the present invention, with such a configuration, both the effect of increasing the volume of the thinning pocket and the effect of reducing the chip shape can be efficiently enhanced and optimized.

In addition, in the present disclosure, the term "approximately" accompanying a numerical value refers to the range of the numerical value±5%. For example, if the numerical value is "10%," "approximately 10%" indicates 9.5% to 10.5%. If the numerical value is "100°," "approximately 100°" indicates 95° to 105°. If the numerical value is "10 times," "approximately 10 times" indicates 9.5 times to 10.5 times.

According to the present disclosure, the one end portion of the drill body is configured to include the first tip portion and the second tip portion, and the drill body is configured to include the first core thickness portion and the second core thickness portion. Therefore, even with four or more cutting edges, the improvement of both the biting property to a work material and the chip discharge property can be achieved.

DETAILED DESCRIPTION

Figure 1:
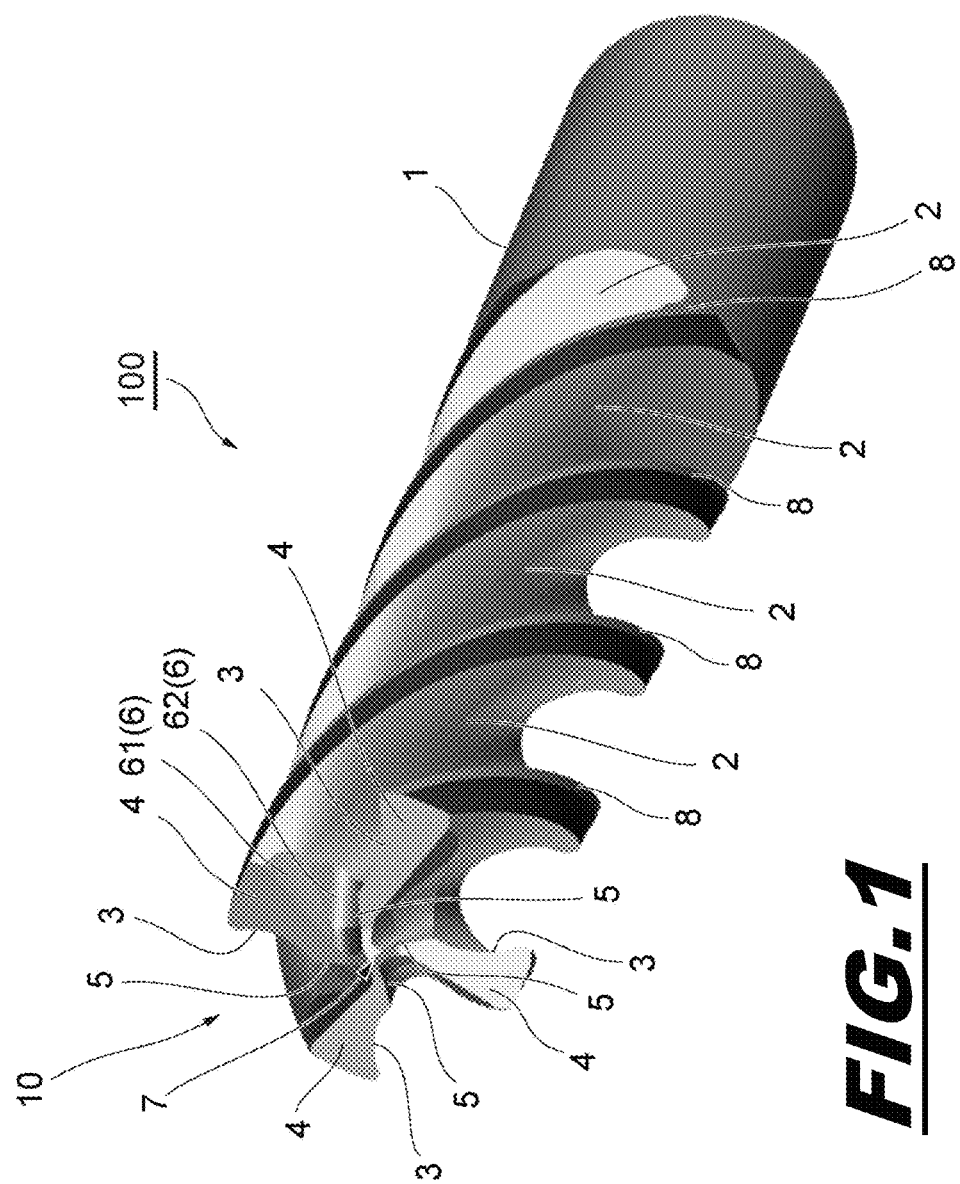
FIG. 1 is a perspective view schematically illustrating a schematic structure of an example of a cutting tool according to an embodiment of the present disclosure.

An embodiment according to an example of the present disclosure will be described hereinafter with reference to the drawings. However, the embodiment described below is merely an example, and an example of the present disclosure can be variously modified and implemented without departing from the spirit of the present disclosure. In addition, in the description of the drawings, the same or similar parts are designated by the same or similar reference numerals, and the drawings are schematic and do not necessarily match the actual dimensions, ratios and the like. Furthermore, a part where the dimensions and ratios of the drawings are different from each other is included in the drawings. Also, the embodiment described below is only part of the present disclosure, and other embodiments obtained by those skilled in the art based on the embodiment of the present disclosure without the need for creative acts are included in the scope of protection of the present disclosure.

Configurations of Embodiment

Figure 2:
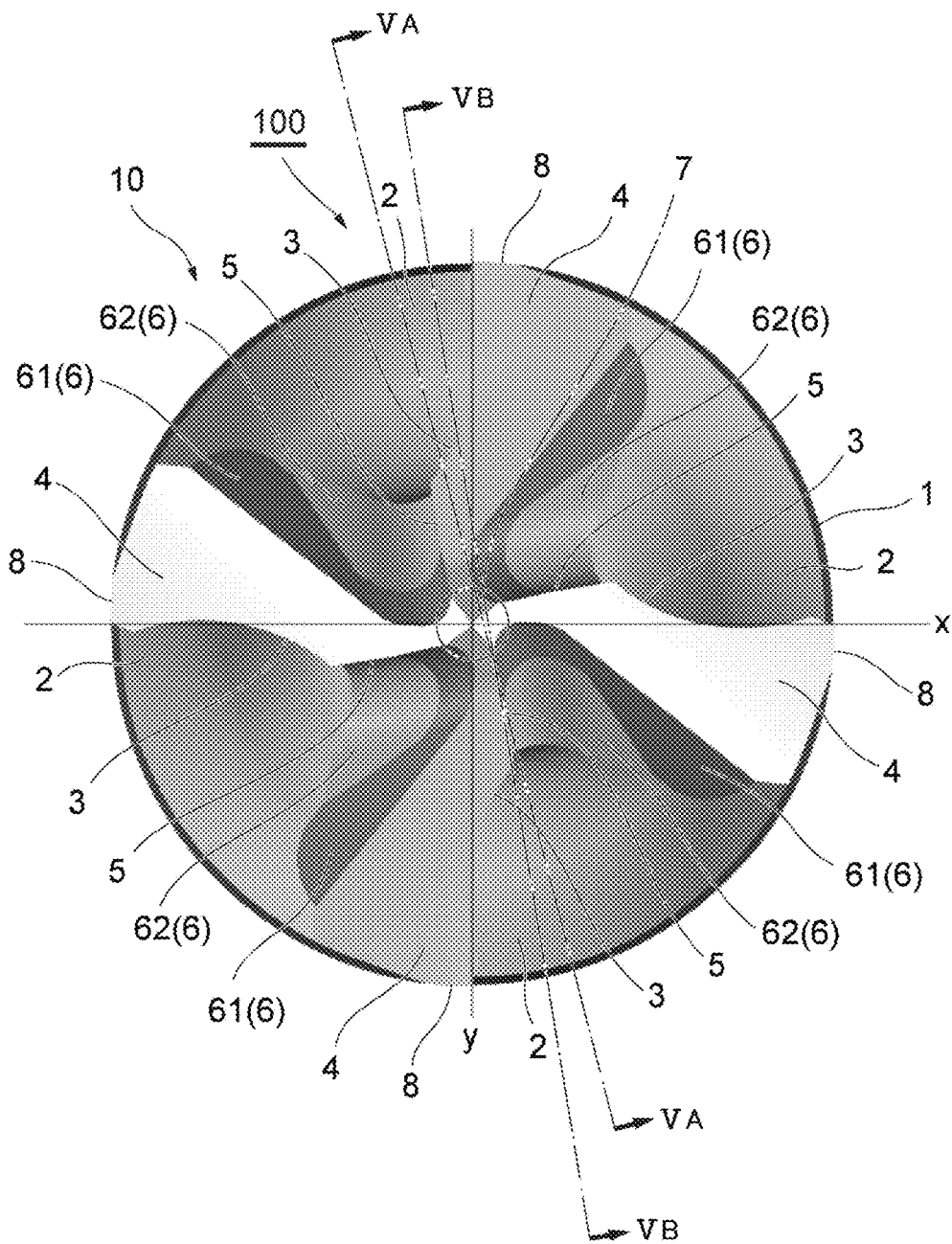
FIG. 2 is a plan view schematically illustrating one end portion of an example of the cutting tool according to an embodiment of the present disclosure.

FIG. 1 is a perspective view schematically illustrating a schematic structure of an example of a cutting tool (4 flute drill) according to an embodiment of the present disclosure. FIG. 2 is a plan view schematically illustrating one end portion of an example of the cutting tool (4 flute drill) according to an embodiment of the present disclosure, the plan view illustrating the shape of the 4 flute drill in an axial tip view (x-axis and y-axis are each a rough indication).

A 4 flute drill 100 (cutting tool) is a twist solid carbide drill that includes, at one end portion 10 of a drill body 1, four curved main cutting edges 3 formed at intervals of, for example, approximately 90° in a circumferential direction in such a manner as to face a forward side of a rotation direction. In the drill body 1, four flute grooves 2 that twist and extend substantially spirally along a central axis P are formed between the main cutting edges 3 adjacent to each other in the circumferential direction. A ridge line where a wall of a flute groove 2 facing in the rotation direction intersects with a tip surface of the one end portion 10 of the drill body 1 defines a main cutting edge 3, and the main cutting edge 3 forms a gentle concave curve in the rotation direction of the 4 flute drill 100 in the axial tip view. Further, a margin 8 is formed at a position corresponding to each main cutting edge 3 on an outer peripheral surface of the drill body 1.

The tip surface of the one end portion 10 is formed of, for example, a twisted surface or a curved surface, and defines a tip flank surface 4 of the main cutting edge 3. A clearance angle of the tip flank surface 4 can be appropriately set according to the type of the work material or the cutting conditions. That is, the clearance angle is set to a constant angle, or if necessary, is increased as the distance from the main cutting edge 3 increases in order to prevent adhesion of the work material or suppress wear to increase the tool life.

Moreover, a thinning portion 6 is provided so as to remove a part of an original chisel edge formed in a central portion of the one end portion 10 of the drill body 1, and after the removal, a chisel edge 7 remains in a central portion of the tip surface of the one end portion 10 in the drill body 1. Four thinning cutting edges 5 formed by the thinning portion 6 form a substantially linear shape in the axial tip view, and the thinning cutting edges 5 and the main cutting edges 3 have intersections thereof (intersections CP to be described hereinafter) connected so as to have a predetermined obtuse angle. These four thinning cutting edges 5 are also formed at the one end portion 10 of the drill body 1 so as to face the forward side of the rotation direction. In this manner, the term "cutting edge" used in the present disclosure is configured by the main cutting edges 3 and the thinning cutting edges 5.

Furthermore, the thinning portion 6 is a thinning portion with a two-stage configuration that includes a first thinning 61 formed at the tip of the flute groove 2 and arranged on the tip flank surface 4 side of the main cutting edge 3, and a second thinning 62 arranged from the first thinning 61 toward the flute groove 2.

Figure 3:
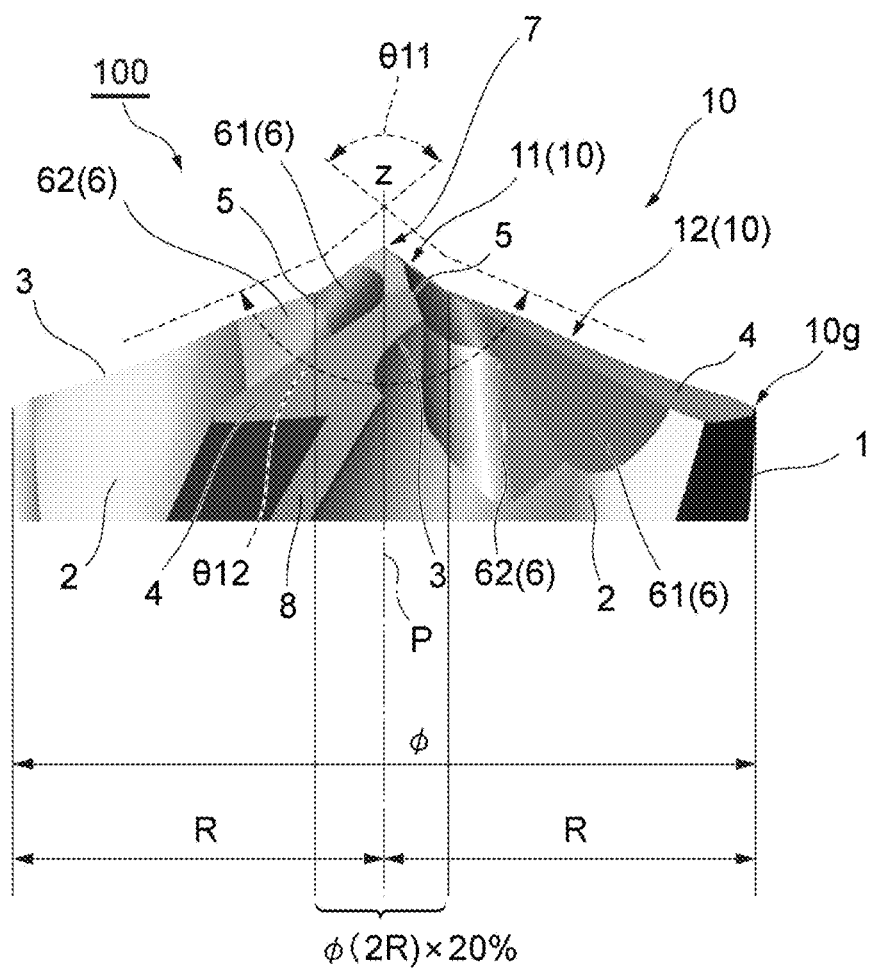
FIG. 3 is a schematic front view schematically illustrating the one end portion and its vicinity of an example of the cutting tool according to an embodiment of the present disclosure, and explaining a tip angle of the one end portion.

FIG. 3 is a schematic front view, schematically illustrating the one end portion and its vicinity of an example of the cutting tool (4 flute drill) according to an embodiment of the present disclosure, and explaining a tip angle of the one end portion (z-axis is a rough indication).

The one end portion 10 of the drill body 1 includes a first tip portion 11 that has a region including the central axis P and forms a sharp head, and a second tip portion 12 that extends from a peripheral edge of the first tip portion 11 to an outer peripheral edge of the drill body 1. Also, as illustrated in FIG. 3, the first tip portion 11 and the second tip portion 12 have, respectively, a tip angle θ11 (first tip angle) and a tip angle θ12 (second tip angle) having a relationship expressed by the following equation (1). In FIG. 3, the broken lines defining the tip angles θ11 and θ12 are virtual lines that are parallel to the surface that is defined by a substantially linear rotation locus obtained when the 4 flute drill is continuously rotating about the central axis P.

$$\theta 11 < \theta 12 \quad (1)$$

More specifically, it is preferred that the first tip portion 11 be formed in such a manner that the first tip portion 11 is a part extending from the central axis P (tool center) to approximately 20% of a radius R of the drill body 1, that is, the diameter of a virtual bottom surface of the first tip portion 11 is 2R×approximately 20% (see FIG. 3). For example, assuming that the diameter φ of the 4 flute drill 100 is 10 mm (radius R=5 mm), the first tip portion 11 is a part where the diameter of the virtual bottom surface thereof is 10 mm×approximately 20%=approximately 2 mm. Also, preferably, the tip angle θ11 of the first tip portion 11 is approximately 120° and the tip angle θ12 of the second tip portion 12 is approximately 140°.

Figure 4:
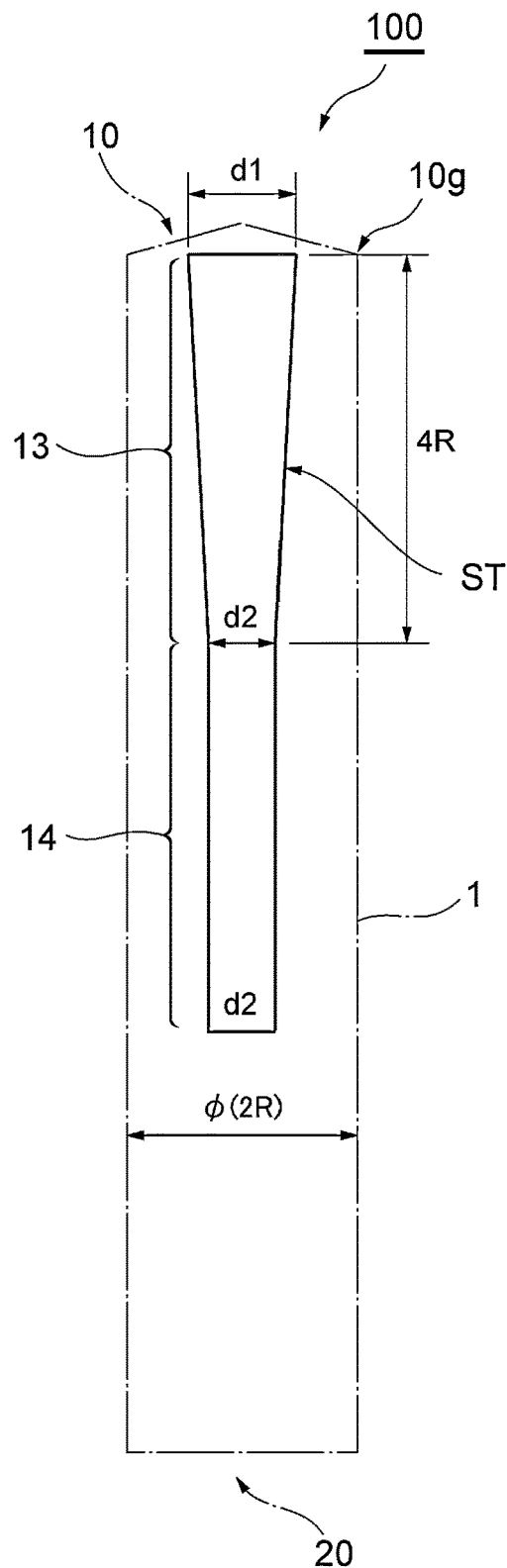
FIG. 4 is a schematic front view for explaining a state of a core thickness of a drill body in an example of the cutting tool according to an embodiment of the present disclosure.

FIG. 4 is a schematic front view for explaining a state of a core thickness of the drill body in an example of the cutting tool (4 flute drill) according to an embodiment of the present disclosure. In FIG. 4, in order to facilitate the understanding of this configuration, the scale of the drill body 1 is illustrated by appropriately enlarging only the radial dimension thereof as compared with FIG. 1.

As illustrated in FIG. 4, focusing on the core thickness, the drill body 1 of the 4 flute drill 100 has a two-stage configuration. That is, the drill body 1 has a first core thickness portion 13 formed so that the core thickness gradually decreases from d1 to d2 from the one end portion 10 to other end portion 20, and a second core thickness portion 14 formed so that the core thickness is constant at d2 from the first core thickness portion 13 toward the other end portion 20.

More specifically, the first core thickness portion 13 has the core thickness d1 of approximately 35% of the diameter φ of the drill body 1 at a hem outer peripheral position 10g of the one end portion 10, and a core thickness taper ST that is formed in such a manner that the core thickness decreases by approximately −2% (approximately −2 mm/100 mm) from the hem outer peripheral position 10g of the one end portion 10 to the position at a distance (=2φ) approximately twice the diameter φ of the drill body 1 toward the other end portion 20. For example, assuming that the diameter φ of the 4 flute drill 100 is 10 mm, the maximum core thickness d1 on the one end portion 10 side of the first core thickness portion 13 is 10 mm×approximately 35%=approximately 3.5 mm, an axial length 2φ of the core thickness taper ST is 20 mm, and the minimum core thickness d2 on the other end portion 20 side of the first core thickness portion 13 (which is also the core thickness of the second core thickness portion 14) is d1−(approximately −2%×20 mm)=approximately 3.5 mm−approximately 0.4 mm=approximately 3.1 mm.

Figure 5A:
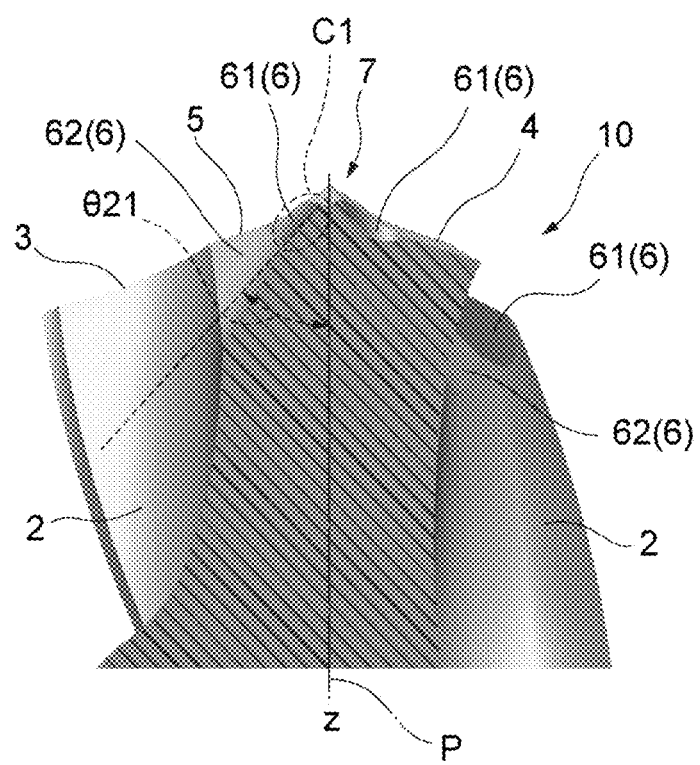
FIG. 5A is a schematic cross-sectional view, schematically illustrating the one end portion and its vicinity of the cutting tool, taken along line V-V of FIG. 1, and explaining a penetration angle of a first thinning.
Figure 5B:
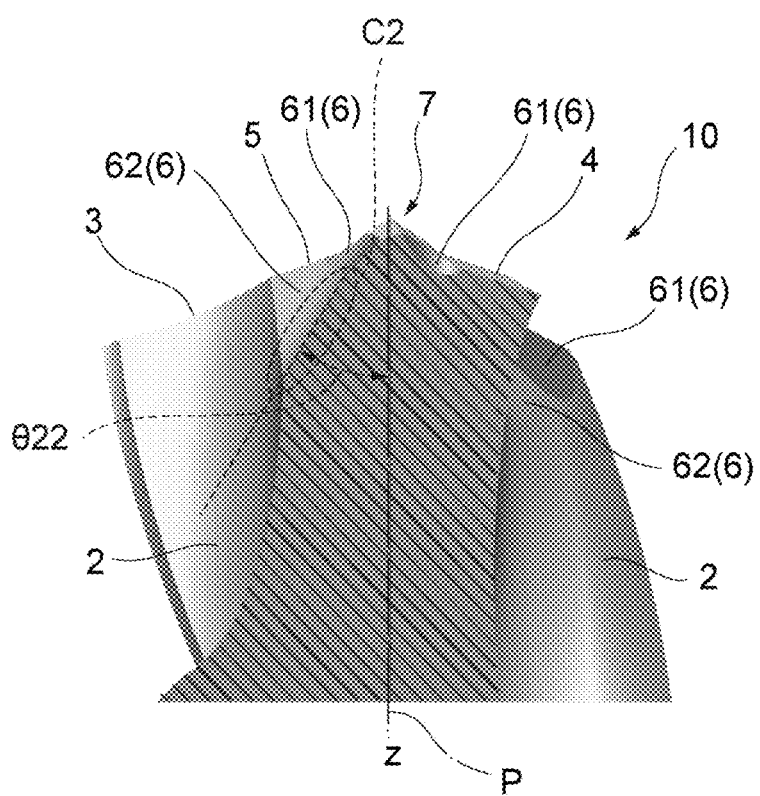
FIG. 5B is a schematic cross-sectional view schematically illustrating the one end portion and its vicinity of the cutting tool, taken along line V-V of FIG. 1, explaining a penetration angle of a second thinning.

Next, FIGS. 5A and 5B are cross-sectional views schematically illustrating the one end portion and its vicinity of the cutting tool, taken along lines VA-VA and VB-VB of FIG. 2, respectively (the z-axis is a rough indication). Further, FIG. 5A is also a diagram for explaining a penetration angle of the first thinning 61, and FIG. 5B is also a diagram for explaining a penetration angle of the second thinning 62. As illustrated in FIG. 2, the line VA-VA in FIG. 2 is parallel to a crossing ridge line between the rake surface of the first thinning 61 and the tip flank surface 4 in the fourth quadrant of x-y coordinates of FIG. 2 (that is, a part of the thinning cutting edge 5 that is formed by the first thinning 61), and is located closer to the thinning portion 6 by a predetermined short distance from the thinning cutting edge 5, as illustrated in FIG. 5A. Similarly, as illustrated in FIG. 2, the line VB-VB in FIG. 2 is parallel to a crossing ridge line (that is, a part of the thinning cutting edge 5 that is formed by the second thinning 62) between the rake surface of the second thinning 62 and the tip flank surface 4 in the fourth quadrant of the x-y coordinates of FIG. 2, and is located closer to the thinning portion 6 by a predetermined short distance (the same distance as in the line VA-VA) from the thinning cutting edge, as illustrated in FIG. 5B.

As illustrated in FIG. 5A, a penetration angle θ21 of the first thinning 61 is an angle formed by a virtual straight line (broken straight line in FIG. 5A) passing through both end points of a cross section of the first thinning 61 (the part surrounded by the broken round frame C1 in FIG. 5A) in the cross section along the line VA-VA of FIG. 2, and the central axis P. Similarly, as illustrated in FIG. 5B, a penetration angle θ22 of the second thinning 62 is an angle formed by a virtual straight line (broken straight line in FIG. 5B) passing through both end points of the cross section of the second thinning 62 in the cross section along the line VB-VB of FIG. 2 (enclosed by the broken line round frame C2 of FIG. 5B), and the central axis P. Specifically, it is preferred that the penetration angle θ21 of the first thinning 61 and the penetration angle θ22 of the second thinning 62 have a relationship expressed by the following equation (2). More specifically, it is more preferred that the penetration angle θ21 of the first thinning 61 be approximately 40° and that the penetration angle θ22 of the second thinning 62 be approximately 30°.

$$\theta 21 > \theta 22 \tag{2}$$

Figure 6:
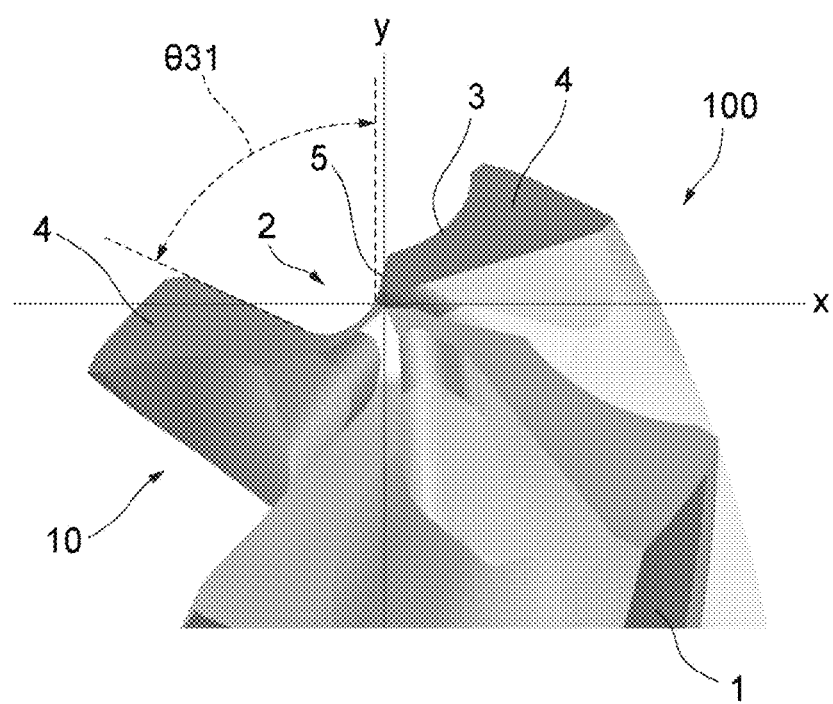
FIG. 6 is a perspective view schematically illustrating the one end portion of an example of the cutting tool according to an embodiment of the present disclosure, and explaining an open angle of the first thinning.
Figure 7:
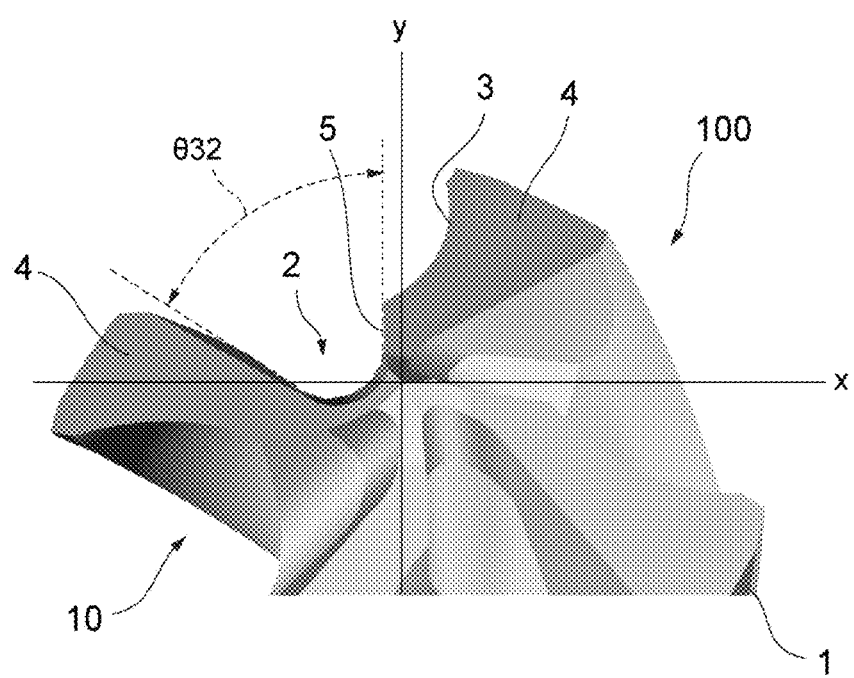
FIG. 7 is a perspective view schematically illustrating the one end portion of an example of the cutting tool according to an embodiment of the present disclosure, and explaining an open angle of the second thinning.

Next, FIGS. 6 and 7 are perspective views in which the one end portion of an example of the cutting tool (4 flute drill) according to an embodiment of the present disclosure is visually recognized from a tip oblique direction (x-axis and y-axis are rough indications). More specifically, as can be seen from the comparison with FIG. 2, FIG. 6 is a perspective view in which the 4 flute drill 100 is viewed from the tip side in the direction orthogonal to the line VA-VA of FIG. 2 and along the penetration angle θ21 of the first thinning 61 (FIG. 5A). The example in FIG. 6 is a perspective view in which a concave space of the thinning portion 6 in the third quadrant of the x-y coordinates of FIG. 2 is viewed from the first quadrant side toward the direction of the penetration angle of the first thinning 61. An open angle θ31 of the first thinning 61 indicates the open angle formed by opposing surfaces of the first thinning 61 in FIG. 6 (except for an R-shaped portion of a concave bottom portion of the first thinning 61).

Similarly, as can be seen from the comparison with FIG. 2, FIG. 7 is a perspective view in which the 4 flute drill 100 is viewed from the tip side in the direction orthogonal to the line VB-VB of FIG. 2 and along the penetration angle θ22 of the second thinning 62 (FIG. 5B). The example in FIG. 7 is a perspective view in which the concave space of the thinning portion 6 in the third quadrant of the x-y coordinates of FIG. 2 is viewed from the first quadrant side toward direction of the penetration angle of the second thinning 62. An open angle θ32 of the second thinning 62 indicates the open angle formed by opposing surfaces of the second thinning 62 in FIG. 7 (except for an R-shaped portion of a concave bottom portion of the second thinning 62). Specifically, it is preferred that the open angle θ31 of the first thinning 61 and the open angle θ32 of the second thinning 62 have a relationship expressed by the following equation (3). More specifically, it is more preferred that the open angle θ31 of the first thinning 61 be approximately 60° and that the open angle θ32 of the second thinning 62 be approximately 55°.

$$\theta 31 > \theta 32 \tag{3}$$

Actions and Effects of Embodiment

According to the 4 flute drill 100 configured in this manner, the thinning cutting edge 5 formed by the thinning portion 6 has a larger rake angle than the original chisel edge, and has a larger volume of the thinning pocket for discharging chips generated during the hole cutting of the work material. Thus, the cutting resistance and biting property to the work material and the chip discharge property can be improved. Further, in the hole cutting process, since the first tip portion 11 located at the one end portion 10 of the drill body 1 and having the relatively small (sharp) tip angle θ11 first comes into contact with the work material, the biting property to the work material can be enhanced sufficiently even if the chisel edge 7 tends to be larger than that of a 2 flute drill. In addition, since the position corresponding to each main cutting edge 3 on the outer peripheral surface of the drill body 1 is provided with the margin 8 in the vertical direction of each main cutting edge 3, the force applied to the main cutting edge 3 is received easily by the margin 8, thereby protecting the main cutting edge 3. Also, since the main cutting edge 3 at the opposing position always has the margin 8, the diameter (outer diameter, tool diameter) of the drill body 1 can be measured easily.

Moreover, at the one end portion 10, since the tip angle θ12 of the second tip portion 12 extending from the first tip portion 11 to the outer peripheral edge of the drill body 1 is larger than the tip angle θ11 of the first tip portion 11, the distance in the direction of the central axis P from the first tip portion 11 biting into the work material to the main cutting edge 3 on the outermost periphery becomes relatively short. This reduces the time it takes for the rotation of the drill body 1 to become unstable when the first tip portion 11 bites into the work material and the cutting by the second tip portion 12 proceeds, and improves the guide function of the drill body 1, since the shoulder of the second tip portion 12 easily fits in the machined hole. In particular, in a case where the first tip portion 11 is formed so as to become a part extending from the central axis P to approximately 20% of the radius R of the drill body 1, wherein the tip angle θ11 of the first tip portion 11 is approximately 120° and the tip angle θ12 of the second tip portion 12 is approximately 140°, loss or damage of the first tip portion 11 is effectively prevented, and the excellent biting property to the work material and the excellent guide function of the drill body 1 can be achieved more reliably.

Additionally, the first core thickness portion 13 extending from the one end portion 10 toward the other end portion 20 has the core thickness taper ST to gradually reduce the core thickness thereof, and the core thickness d2 of the second core thickness portion 14 further extending toward the other end portion 20 is set to be constantly thin. Therefore, by appropriately setting the degree of reduction of the core thickness, the core thickness can be reduced from the part near the one end portion 10 to drastically increase the volume of the flute groove 2 at an early stage. As a result, the chip discharge property can be further improved. In particular, in a case where the core thickness d1 at the hem outer peripheral position 10g of the first core thickness portion 13 is approximately 35% of the diameter φ of the drill body 1, and the core thickness taper ST is formed in such a manner that the core thickness d2 decreases by approximately −2% (approximately −2 mm/100 mm) of the core thickness d1 from the hem outer peripheral position 10g to the position at a distance approximately twice the diameter φ of the drill body 1 toward the other end portion 20, the excellent chip discharge property can be achieved more reliably while keeping the rigidity of the drill body 1.

Since the thinning portion 6 with a two-stage configuration that includes the first thinning 61 arranged on the tip flank surface 4 side of the main cutting edge 3 and the second thinning 62 arranged from the first thinning 61 toward the flute groove 2 is provided, the volume of the thinning pocket can be made larger than that of the thinning portion of the one-stage configuration (only the first thinning 61 or the second thinning 62), whereby the chip discharge property can be further improved.

Figure 8:
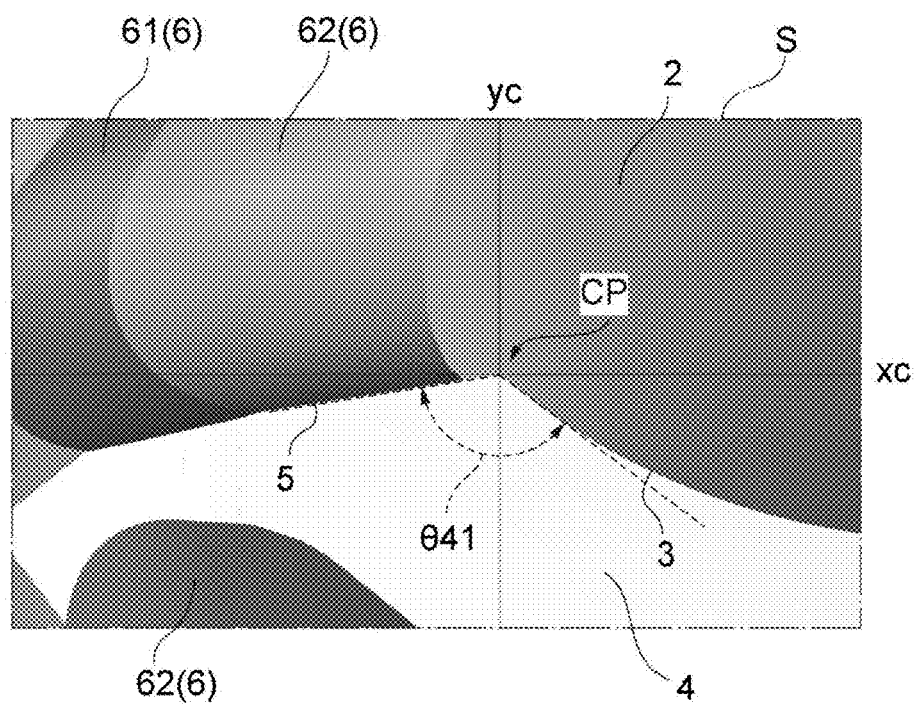
FIG. 8 is a schematic plan view illustrating the enlargement of a peripheral part of an intersection between a main cutting edge and a thinning cutting edge in an example of the cutting tool according to an embodiment of the present disclosure, and explaining a state of the intersection.
Figure 9:
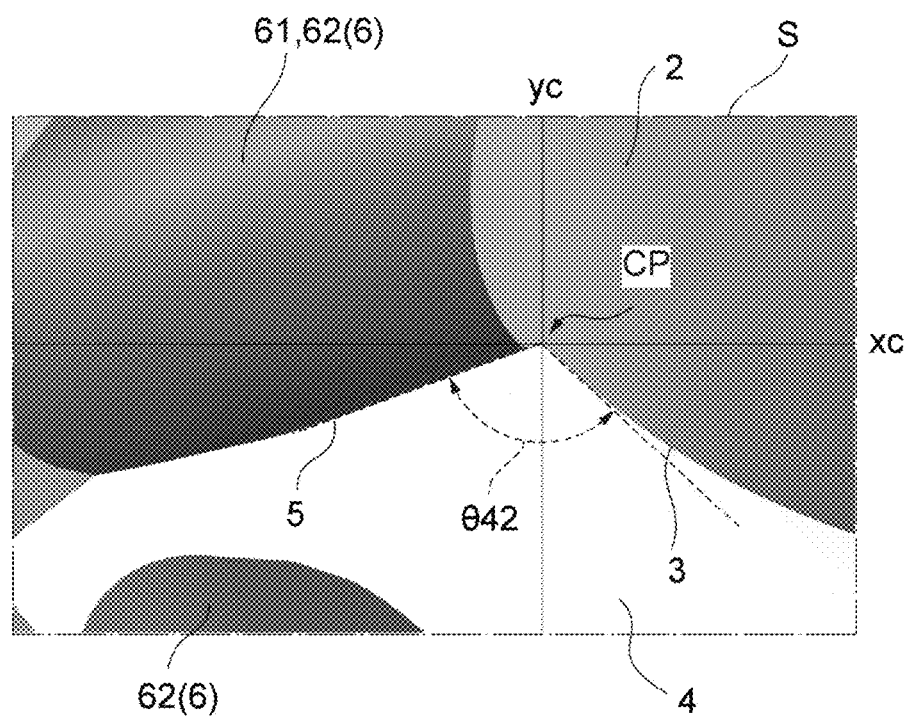
FIG. 9 is a schematic plan view illustrating the enlargement of a peripheral part of an intersection between a main cutting edge and a thinning cutting edge in another example of the cutting tool according to an embodiment of the present disclosure, and explaining a state of the intersection.

FIG. 8 is a schematic plan view illustrating the enlargement of a peripheral part of an intersection CP between the main cutting edge 3 and the thinning cutting edge 5 in an example of the 4 flute drill according to an embodiment of the present disclosure, and explaining a state of the intersection CP. FIG. 9 is a schematic plan view illustrating the enlargement of a part corresponding to the region illustrated in FIG. 8 in another example of the 4 flute drill according to an embodiment of the present disclosure, and explaining, as with FIG. 8, the state of the intersection CP between the main cutting edge 3 and the thinning cutting edge 5. The xc axis and the yc axis in both diagrams are each a rough indication of the intersection CP.

As illustrated in these diagrams, an internal angle $\theta 41$ of the intersection CP between the main cutting edge 3 and the thinning cutting edge 5 when the two-stage thinning portion 6 is provided, can be more obtuse than an internal angle $\theta 42$ of the intersection CP between the main cutting edge 3 and the thinning cutting edge 5 when the one-stage thinning portion 6 is provided (i.e., a relationship expressed by the following equation (4)). This brings about an advantage that loss of the intersection CP and a surrounding part can be suppressed.

$$\theta 41 > \theta 42 \qquad (4)$$

Furthermore, by configuring the penetration angle $\theta 21$ and the open angle $\theta 31$ of the first thinning 61 to be larger than the penetration angle $\theta 22$ and the open angle $\theta 32$ of the second thinning 62 respectively, the volume of the thinning pocket is further increased by the first thinning 61. As a result, the chip discharge property can be further improved. Also, curls of the generated chips (winding condition) can be reduced by the second thinning 62. As a result, the shape of the chips is made small, allowing the chips to easily move through the flute groove 2 more densely and quickly. As a result, the chip discharge property can be further improved. By setting the penetration angle $\theta 21$ and the open angle $\theta 31$ of the first thinning 61 to approximately 40° and approximately 60° respectively and setting the penetration angle $\theta 22$ and the open angle $\theta 32$ of the second thinning 62 to approximately 30° and approximately 55° respectively, both the effect of increasing the volume of the thinning pocket and the effect of reducing the chip shape can be efficiently enhanced and optimized.

The above has described in detail an embodiment as an example of the present disclosure. However, the foregoing description is merely an example of the present disclosure in all aspects, and needless to say, various improvements and modifications can be made without departing from the scope of the present disclosure. Additionally, each of the foregoing configuration examples may be partially replaced, or may be appropriately combined and configured. Also, the changes mentioned appropriately in each example are possible. This application is based on Japanese Patent Application No. 2021-063934 filed on Apr. 5, 2021, and the description thereof is incorporated herein by reference.

Also, the present disclosure can also be expressed as follows.

[1] A cutting tool, comprising: a drill body rotated about a central axis;
four or more cutting edges formed on one end portion of the drill body to face a forward side of a rotation direction;
a flute groove that is formed between the cutting edges adjacent to each other in a circumferential direction and extends substantially spirally along the central axis; and
a thinning portion that is formed at a tip of the flute groove and includes a first thinning arranged on a flank surface side of the cutting edges and a second thinning arranged from the first thinning toward the flute groove,
wherein
the one end portion includes a first tip portion that includes the central axis and forms a first tip angle, and a second tip portion that extends from the first tip portion to an outer peripheral edge of the drill body and forms a second tip angle larger than the first tip angle,
the drill body includes a first core thickness portion that is formed in such a manner that a core thickness thereof gradually decreases from the one end portion to other end portion, and a second core thickness portion that is formed in such a manner that a core thickness thereof is constant from the first core thickness portion toward the other end portion, and
the first thinning has a penetration angle and an open angle larger than a penetration angle and open angle of the second thinning.

[2] The cutting tool described in [1] above, wherein the first tip portion is formed so as to be a part extending from the central axis to approximately 20% of a radius of the drill body,
the first tip angle is approximately 120°, and
the second tip angle is approximately 140°.

[3] The cutting tool described in [1] or [2] above, wherein the first core thickness portion includes a core thickness of approximately 35% of a diameter of the drill body at a hem outer peripheral position of the one end portion, and a core thickness taper formed in such a manner that the core thickness decreases by approximately −2% from the hem outer peripheral position of the one end portion to a position at a distance approximately twice the diameter of the drill body toward the other end portion.

[4] The cutting tool described in [1] or [2], wherein the penetration angle and the open angle of the first thinning are approximately 40° and approximately 60° respectively, and
the penetration angle and the open angle of the second thinning are approximately 30° and approximately 55° respectively.

What is claimed is:

1. A cutting tool, comprising:
a drill body rotated about a central axis;
four or more cutting edges formed on one end portion of the drill body to face a forward side of a rotation direction; and
a flute groove that is formed between the cutting edges adjacent to each other in a circumferential direction and extends substantially spirally along the central axis; and a thinning portion that is formed at a tip of the flute groove and includes a first thinning arranged on a flank surface side of the cutting edges and a second thinning arranged from the first thinning toward the flute groove, wherein the one end portion includes a first tip portion that includes the central axis and forms a first tip angle, and a second tip portion that extends from the first tip portion to an outer peripheral edge of the drill body and forms a second tip angle larger than the first tip angle, the drill body includes a first core thickness portion that is formed in such a manner that a core thickness thereof gradually decreases from the one end portion toward an other end portion, and a second core thickness portion that is formed in such a manner that a core thickness thereof is constant from the first core thickness portion toward the other end portion, and the first thinning has a penetration angle and an open angle larger than a penetration angle and an open angle of the second thinning.

2. The cutting tool according to claim 1, wherein
the first tip portion is formed so as to be a part extending from the central axis to approximately 20% of a radius of the drill body,
the first tip angle is approximately 120°, and
the second tip angle is approximately 140°.

3. The cutting tool according to claim 1, wherein the first core thickness portion includes a core thickness of approximately 35% of a diameter of the drill body at a hem outer peripheral position of the one end portion, and a core thickness taper formed in such a manner that the core thickness decreases by approximately-2% from the hem outer peripheral position of the one end portion to a position at a distance approximately twice the diameter of the drill body toward the other end portion.

4. The cutting tool according to claim 1, wherein
the penetration angle and the open angle of the first thinning are approximately 40° and approximately 60° respectively, and
the penetration angle and the open angle of the second thinning are approximately 30° and approximately 55° respectively.

* * * * *